United States Patent [19]

Sugimura et al.

[11] Patent Number: 5,069,803

[45] Date of Patent: Dec. 3, 1991

[54] SYNTHETIC RESIN COMPOSITION CONTAINING GALLIUM PARTICLES AND USE THEREOF IN THE GLIDE SURFACING MATERIAL OF SKIS AND OTHER APPLICATIONS

[75] Inventors: Kentaro Sugimura, Chiba; Shoji Hasimoto, Kosakamachi; Takayuki Ono, Sendai, all of Japan

[73] Assignee: Dowa Mining Co., Ltd., Tokyo, Japan

[21] Appl. No.: 408,770

[22] Filed: Sep. 18, 1989

[30] Foreign Application Priority Data

Apr. 27, 1989 [JP] Japan .................................. 1-108126
Jul. 7, 1989 [JP] Japan .................................. 1-176497

[51] Int. Cl.$^5$ ........................................... C10M 125/04
[52] U.S. Cl. ...................................... 252/26; 524/439; 523/204
[58] Field of Search ...................... 524/439; 523/204; 252/26

[56] References Cited

U.S. PATENT DOCUMENTS

| | | | |
|---|---|---|---|
| 2,947,646 | 8/1960 | Devaney et al. | 524/939 |
| 2,973,292 | 2/1961 | Yanko et al. | 524/439 |
| 3,391,080 | 7/1968 | Buckley | 252/26 |
| 3,405,063 | 10/1968 | Boes et al. | 252/12 |
| 3,723,481 | 3/1973 | Bobear | 524/439 |
| 4,076,637 | 2/1978 | Hurst | 252/26 |
| 4,233,103 | 11/1980 | Shaheen | 524/439 |
| 4,533,685 | 8/1985 | Hudgin et al. | 524/439 |
| 4,828,758 | 5/1989 | Gillberg-Lafore et al. | 524/439 |
| 4,952,475 | 8/1990 | Kato et al. | 523/204 |

FOREIGN PATENT DOCUMENTS 58-4573  1/1983  Japan .
62-217980  9/1987  Japan .

*Primary Examiner*—Prince Willis, Jr.
*Assistant Examiner*—Ellen McAvoy
*Attorney, Agent, or Firm*—Frishauf, Holtz, Goodman & Woodward

[57] ABSTRACT

A synthetic resin composition having particles of metallic gallium or gallium alloy dispersed uniformly in a synthetic resin is particularly useful for the production of a surfacing material for a glider for use on snow or ice. When a molten paraffin wax is applied to such surfacing material, part of the wax penetrates into the resultant sheet to form a gallium-paraffin mixture on the surface of the gallium particles and at lower snow or ice temperatures, the gallium particles expand, and as a result of their expansion, the gallium particles are held strongly enough on the gliding surface of, for example, a ski to maintain good water-repelling and glide characteristic over a prolonged period without the gallium-paraffin mixture becoming detached from the ski. The composition is also useful for many other similar uses such as a plastic gear, a constructional material, a marine structural material and the like, because of its excellent glide, water-repelling and wear resisting properties, which can be retained for a prolonged period.

30 Claims, No Drawings

SYNTHETIC RESIN COMPOSITION CONTAINING GALLIUM PARTICLES AND USE THEREOF IN THE GLIDE SURFACING MATERIAL OF SKIS AND OTHER APPLICATIONS

BACKGROUND OF THE INVENTION

Field of the Information

The present invention relates to a composition having a new form of metallic gallium or gallium alloy particles mixed uniformly in a synthetic resin. The present invention also relates to an article of use employing this synthetic resin composition or a fabricated product thereof.

Background Information

There have been known various composite materials in which metals or non-metals are mixed with synthetic resins. Various kinds of metals or non-metals are used as fillers either on their own or as admixtures.

One of the recent marked changes in the construction materials of skis is an increasing shift from wood to plastics in the glide surfacing material and plastic skis to which snow does not stick and which give skiers faster glide. Such material and skis are now available on the market. Active research efforts are thus being made to produce improved glide surfacing materials of skis and several patent applications have been filed in this area. For example, Japanese Patent Public Disclosure No. 58-4573 entitled "Surfacing Material for Skis" shows a surfacing material of ski consisting of a plastic material mixed with a clathrate compound of wax, paraffin or a mixture thereof included in a cyclodextrin. Japanese Patent Public Disclosure No. 62-217980 entitled "Glide Surfacing Material of Ski and Process for Producing the Same" shows a glide surfacing sheet for skis that has granules of a superhigh-molecular weight polyolefinic resin dispersed uniformly in a high-molecular weight polyolefinic resin.

Gallium in the metallic state can be used in solid lubricants and this technique has already been well known as disclosed in U.S. Pat. Nos. 3,391,080 and 3,405,063. However, the melting point of gallium is extremely low (29.78° C.) and special considerations are needed in its processing. Therefore, the use of solid lubricants comprising metallic gallium has been very limited.

Plastic gear materials are also known in the art that have molybdenum disulfide ($MoS_2$), graphite, etc. incorporated in synthetic resins such as nylons and polypropylene. However, these gear materials are unable to exhibit the intended lubricating property unless molybdenum disulfide or graphite is added in more than several percent. They also have a serious defect in that they are black in color. Hence, it has been desired to make some improvement on those gear materials.

A higher level of water repellency and wear resistance has been desired in plastic compositions and the glide surfacing material of skis. In fact, however, the maximum level that can be attained by the state of the art is no more than those taught in the patents listed above and a need has existed for the accomplishment of further improvements in performance.

The present inventors conducted intensive studies in order to meet this need and found that metallic gallium or gallium alloy could be produced by certain means in the form of fine particles no larger than 150 microns, or even a size of 50 microns and below. When the surfaces of the so obtained gallium or gallium alloy particles (hereunder sometimes simply referred to as "gallium particles" were coated with paraffin or some other material, it became possible to effect uniform dispersion of metallic gallium or gallium alloy in resins which had previously been held impossible to mix with metallic gallium by the prior art. This accomplishment of the manufacture of compositions having the particles of metallic gallium or gallium alloy dispersed uniformly in synthetic resins has led to the development of various articles of use in which the inherent characteristics of the resin compositions are fully exploited.

SUMMARY OF THE INVENTION

An object, therefore, of the present invention is to provide a composition having the particles of metallic gallium or gallium alloy dispersed uniformly in a synthetic resin.

Another object of the present invention is to provide a process for producing a shaped article of gallium particle containing synthetic resin, which process comprises mixing a synthetic resin with metallic gallium or gallium alloy particles and then shaping the mixture by either extrusion or sintering.

A further object of the present invention is to provide a surfacing material for a glider on snow or ice that comprises a shaped resin having metallic gallium or gallium alloy particles mixed uniformly with a synthetic resin.

A still further object of the present invention is to provide a ski having improved glide characteristics that uses as the glide surfacing material a shaped resin article prepared by uniformly mixing metallic gallium or gallium alloy particles with a molten synthetic resin and then shaping the mixture by extrusion.

Another object of the present invention is to provide a bobsleigh, a snow surfing board or other gliders on snow or ice that are furnished with said glide surfacing material.

Still another object of the present invention is to provide a plastic gear which is made of said shaped resin article.

Yet another object of the present invention is to provide a construction material which is required to have either good slide as in a fusuma (Japanese sliding door) or sufficient water repellency to withstand use outdoors.

A further object of the present invention is to provide a marine structural material useful as a material for a motorboat etc., which is required to have good slide in water and water repellency.

A still further object of the present invention is to provide a composition having plastic particles on which metallic gallium or gallium alloy is deposited, said particles being uniformly dispersed in a synthetic resin.

DETAILED DESCRIPTION OF THE INVENTION

Any synthetic resins that can be mixed uniformly with the fine particles of metallic gallium or gallium alloy may be used in the present invention. Typical examples of such resins include: polystyrene; polyvinyl chloride; polyvinyl acetate: polyacrylonitrile; poly(meth)acrylic acid and salts or esters thereof such as polymethyl methacrylate; polyacrylamide or derivatives thereof such as quaternized products and N-methylol derivatives; polyolefins such as polyethylene and polypropylene; polytetrafluoroethylene; polycarbonates; polyphenylene sulfides; natural and synthetic rubbers such as polybutadiene, polyisoprene and polychloroprene; styrene/butadiene rubber, acrylonitrile/-butadiene/styrene rubber, and copolymers of monomers consisting of the constituent members of these polymers and those of other copolymers; as well as polyurethane resins, nylon resins, polyester resins, phenolic resins, melamine resins, urea resins, epoxy resins, etc.

The present inventors confirmed by experiment that for achieving good miscibility with synthetic resins, gallium particles preferably have a size of no greater than 150 microns, more preferably no greater than 50 microns. Such gallium particles are preferably mixed in amounts of 0.001-30 parts by weight, more preferably 0.05-10 parts by weight, with 100 parts by weight of synthetic resin.

The present inventors also confirmed by experiment that synthetic resins having molecular weights higher than $10^5$ which are uniformly mixed with gallium particles no larger than 150 microns, preferably no larger than 50 microns, exhibited sufficient degrees of water repellency and wear resistance to be preferably used as glide surfacing materials of skis.

Another notable feature of the present invention may be described as follows: at subfreezing temperatures, since a very limited portion of each of the gallium particles exists exposed on the surface of the glide surfacing material as a result of waxing, i.e. by being melted on the surface and rubbed to form a thin flat layer whereas the greater part of the gallium particles remain beneath the surface; and since the gallium particles expand by themselves at such low temperatures, the exposed portion of them will be retained stably forming a thin layer that covers the resin matrix of the glide surfacing material and the buried portion that is continuous to said exposed portion will expand and become less and less likely to wear off and separate from the gliding surface. If a commercial wax is applied to the gliding surface having the characteristics described above, the wax will coalesce effectively with the thin layer of exposed gallium particles while at the same time, a small portion of it will penetrate into the gallium particles. As a result, a stable mixture of gallium and wax will form on the gliding surface and the resulting increase in water repellency contributes a further improvement in glide characteristics, with the added advantage that the gallium-wax mixture will not easily come off the gliding surface. At subfreezing temperatures, the hardness of gallium particles increases and prevents snow crystals from sticking in the gliding surface, thereby ensuring reasonable glide characteristics over a prolonged period of time.

When a paraffin wax is applied to the glide surfacing material of a ski, part of the gallium particles in the surface of the material will melt and spread over the gliding surface. Since the wax itself is either applied in a molten state or heated after being applied in a solid state, it will penetrate uniformly into the surfacing material to form a gallium-paraffin mixture on the surface of gallium particles. Below ordinary temperatures, the wax will solidify, so the conventional waxing method which solely depends upon the application of paraffin has paraffin layer during skiing on the snow. In contrast, the gallium-paraffin mixture described above has proved to be several times as separation-resistant as the wax layer applied by the conventional method. In o&her words, one of the great advantages attendant on the use of fine gallium particles according to the present invention is that the gallium particles will expand at cold temperatures to become more resistant to separation and hence less likely to come off the gliding surface of a ski. As a consequence, the lubricating property of gallium particles will be fully exploited, to give marvelous results, by professional skiers who compete within the time difference on the order of hundredths of a second or by skiers who have to play on skiing grounds subject to great temperature variations.

Another use of the resin composition of the present invention is as a plastic gear material. The present inventors have confirmed that fine gallium particles are reasonably miscible with all plastic materials that are currently used for this purpose including nylon and polypropylene resins. There is no particular limitation on the size of gallium particles that can be used and those ranging from 0.5 to 50 microns in size will normally suffice. It has been confirmed by the present inventors that sizes of about 3-10 microns are particularly miscible with synthetic resins. Gallium particles may be added in widely varying amounts ranging from 0.01 to 10 wt % or even higher. The present inventors have confirmed that gallium particles incorporated in an amount of about 0.1 wt % of the final product of use are sufficient for the ideal level of lubricity to be exhibited either as glide surfacing materials of skis and the like or as gears.

Still other uses of the resin composition of the present invention or shaped articles thereof are as indoor construction materials that need good slide characteristics such as sliding doors, fusuma, doorsills and windowsills, or as outdoor construction materials which are required to be water-repellent, or as marine structural materials for the construction of motorboats, etc.

An additional advantage of the present invention is that the lubricating property of gallium particles can be utilized without impairing inherent properties of synthetic resins such as nylons.

The gallium particle to be incorporated in synthetic resins according to the present invention may be used either on their own or as alloys with zinc, indium, aluminum, etc. It has also been confirmed that the surfaces of gallium or gallium alloy particles may be covered with coating agents. Suitable coating agents include lubricants such as wax, silane coupling agents, polymerizable monomers, propylene polymers, atactic polymers, ethylene oxide polymers, etc.

As another embodiment of the present invention, there is provided a synthetic resin composition prepared by dipping plastics particles from 1 $\mu$m to 5 mm, preferably from 1 $\mu$m to 300 $\mu$m and most preferably from 1 $\mu$m to 30 $\mu$m in size in molten metallic gallium or gallium alloy prepared in advance to deposit gallium or gallium alloy on the particles, and mixing the resulting particles with a synthetic resin to obtain a gallium containing resin composition. It has been confirmed that commercially available polyethylene particles from 1 mm to 5 mm in size can be used for the above-mentioned purpose as they are or after being pulverized into sizes in the range of from 1 $\mu$m to 300 $\mu$m, more preferably from 1 $\mu$m to 30 $\mu$m. It has been confirmed that the composition thus obtained can be a substitute for the previously mentioned composition having the particles of metallic gallium or gallium alloy dispersed in a synthetic resin and is almost equally useful for uses intended for the same.

The following examples are provided for the purpose of further illustrating the present invention but are in no way to be taken as limiting.

EXAMPLE 1

Polyethylene was used as a synthetic resin. A hundred parts by weight of polyethylene was mixed with 3 parts by weight of gallium particles having the composition shown in Table 1 and an average size of about 5 microns. After blending in a common agitator, a sheet measuring 50×100×2 (cm) was formed by extrusion molding. The gallium particles were uniformly dispersed in the sheet, which was found to have good sliding, water repelling and wear resisting properties.

TABLE 1

| Particles Added | Glide | Water Repellency | Wear Resistance |
| --- | --- | --- | --- |
| Ga | ⊚ | ⊚ | ⊚ |
| Ga-5 Zn | ○ | ⊚ | ○ |
| Ga-15 Zn | ○ | ⊚ | ○ |
| Ga-40 In | ⊚ | ○ | ⊚ |
| Ga-5 Al | ○ | ○ | ○ |
| Ga-15 Al | ○ | ○ | ○ |
| no addition | x | x | x |

⊚: Very Good
○: Good
x: Poor

EXAMPLE 2

Fifty parts by weight of high-density polyethylene (MW, $1-3\times10^5$) was melted by heating and intimately mixed with one part by weight of gallium particles having an average size no greater than 5 microns. By conventional extrusion molding, a sheet was made for use as a glide surfacing material of a ski. The gallium particles were found to be uniformly dispersed in this surfacing material. When a molten paraffin wax was applied to the surface of the sheet, part of the wax was found to penetrate into the sheet to form a gallium-paraffin mixture on the surface of gallium particles. It was also found that at lower snow temperatures, the gallium particles expanded by themselves, rendering the gallium-paraffin mixture more resistant to separation from the ski in the glide phase. In other words, as the result of their expansion, gallium particles were held strongly enough on the gliding surface of ski to maintain good water-repelling and glide characteristics over a prolonged period without allowing the gallium-paraffin mixture to come off the ski.

EXAMPLE 3

A nylon resin was melted by heating and mixed with 0.1 wt % of gallium particles of 5 microns in size. The mixture was subjected to conventional extrusion molding and fabricated to make a composition in sheet form for use as a plastic gear material. This composition was found to be colorless, transparent and highly lubricating and wear resisting and yet the inherent good characteristics of the nylon gear material were not impaired at all.

COMPARATIVE EXAMPLE 1

A nylon resin was melted by heating and mixed with 5 wt % of $MoS_2$ particles of 10 microns in size. The mixture was subjected to conventional extrusion molding and fabricated to make a composition in sheet form for use as a plastic gear material. The composition was black in color and its lubricating property was somewhat improved over the gear material that was solely composed of a nylon resin.

EXAMPLE 4

A polypropylene resin was melted by heating and mixed with 0.1 wt % of gallium particles of 5 microns in size. The mixture was subjected to conventional extrusion molding to make a composition in plate form for use as a constructional material. The composition was colorless and transparent and exhibited sufficiently high levels of lubricating and water-repelling properties to be suitable for use as fusuma material featuring good slide characteristics. It was also suitable for use as an outdoor constructional material that prevented sticking of snow, ice or water droplets.

EXAMPLE 5

A polypropylene resin was melted by heating and mixed with 1 wt % of Ga-10Zn alloy particles of 5 microns in size. The mixture was subjected to conventional extrusion molding to make a composition in plate form for use as a marine structural material to be used for the construction of motorboats, etc. The composition, though slightly black, exhibited good lubricating and water-repelling properties as well as good wear resisting property.

EXAMPLE 6

Polyethylene particles having an average particle size of 5 μm obtained by pulverizing commercially available polyethylene particles 1-5 mm in size were dipped in a molten metallic gallium or gallium alloy having the composition given in Table 2 for about 30 minutes to thereby deposit gallium or gallium alloy on the surfaces of said particles.

The resulting particles were separated from the molten metal to be collected. Twenty parts by weight of the metal deposited polyethylene particles were mixed with 100 parts by weight of polyethylene used as a matrix resin and the mixture was fully mixed by using a conventional agitator, followed by being molded by an extruder into a sheet 50 cm wide, 100 cm long and 2 cm thick. It was confirmed that gallium or gallium alloy particles had been uniformly dispersed in the shaped article, which exhibited excellent gliding, water-repelling and wear resisting properties. The applied products of the kinds as shown in Examples 2 through 5 prepared from the above shaped article were confirmed to exhibit satisfactory characteristic properties for the respective purposes, though a slight difference was observed as compared with the case when metallic gallium or gallium alloy particles were used.

TABLE 2

| Particles Added | Glide | Water Repellency | Wear Resistance |
| --- | --- | --- | --- |
| Metallic Ga | ⊚ | ⊚ | ⊚ |
| Ga-35 Zn | ○ | ⊚ | ○ |
| Ga-70 Zn | ○ | ⊚ | ○ |
| Ga-40 In | ⊚ | ○ | ⊚ |
| Ga-50 Al | ○ | ○ | ○ |
| Ga-70 Al | ○ | ○ | ○ |
| Plastics Particles Only | x | x | x |

⊚: Very Good
○: Good
x: Poor

As described on the foregoing pages, the synthetic resin composition of the present invention, as well as shaped products thereof such as glide surfacing materials of skis could be obtained only after the development of fine metallic gallium or gallium alloy particles that were not attainable by the prior art.

The process for producing fine metallic gallium or gallium alloy particles which can be used in the present invention is disclosed in the co-pending Japanese Patent Application 1-104996 filed Apr. 25, 1989.

The process comprises the steps of melting metallic gallium or gallium alloy in an atmosphere of inert gas such as nitrogen or argon at a temperature higher than the melting point of gallium or gallium alloy to be melted but not higher than 100° C., preferably at a temperature in the range of 70°-90° C. and atomizing the molten metal through a nozzle into a cooling medium which can be a plain water or an aqueous solution of at least one compound selected from the group consisting of alcohols, oleic acid and salts thereof such as sodium oleate and coating agents such as a surfactant, keeping the cooling medium at a temperature not higher than 10° C., preferably not higher than 5° C., said cooling medium being placed in an open air or in a sealed tank which is kept under inert gas atmosphere. The pressure of inert gas for atomizing the molten metal from the nozzle is preferably in the region of 5-10 kg/cm$^2$ when nitrogen is used for that purpose. Proper inert gas pressure can be determined depending on the desired particle size of the product fine particles. More detailed information can be found in the co-pending Japanese Patent Application 1-104996, mentioned above.

It was also found by later studies that almost equally advantageous results could be obtained by incorporating in a synthetic resin metal deposited plastic particles prepared by dipping plastic particles in a previously prepared molten metallic gallium or gallium alloy.

The surfacing material for use in gliders on snow or ice such as skis or sleighs that is produced using the resin composition of the present invention is satisfactory in all aspects of water repellency, wear resistance and glide characteristics. Plastic gear materials produced by fabricating said resin composition exhibit significantly enhanced lubricating property without impairing the inherent desirable characteristics of plastics. These articles of use can be produced by customary methods of molding synthetic resins, so that desired products can be manufactured at low cost and in high volumes.

What is claimed is:

1. A synthetic resin composition comprising particles no larger than 150 microns of a metallic gallium or gallium alloy selected from the group consisting of gallium-zinc, gallium-indium and gallium-aluminum dispersed uniformly in a synthetic resin.

2. The synthetic resin composition of claim 1, wherein said particles are no larger than 50 microns.

3. The synthetic resin composition of claim 1, wherein the synthetic resin is selected from the group consisting of polystyrene, polyvinyl chloride, polyvinyl acetate, polyacrylonitrile, poly(meth)acrylic acid and salts and esters thereof, polyacrylamide, polyolefins, polytetrafluoroethylene, polycarbonates, polyphenylene sulfides, polybutadiene, polyisoprene, polychloroprene, styrene/butadiene rubber, acrylonitrile/butadiene/styrene rubber, polyurethane resins, nylon resins, polyester resins, phenolic resins, melamine resins, urea resins and epoxy resins.

4. The synthetic resin composition of claim 1, wherein the synthetic resin is selected from the group consisting of polyolefin and nylon.

5. The synthetic resin composition of claim 1, wherein the synthetic resin is selected from the group consisting of polyethylene, polypropylene and nylon.

6. The synthetic resin composition of claim 1, wherein the gallium or gallium alloy particles are in an amount of 0.001 to 3 parts by weight per 100 parts by weight of the synthetic resin.

7. The synthetic resin composition of claim 1, wherein the gallium alloy is selected from the group consisting of GA-5 Zn, Ga-15 Zn, Ga-40 In, Ga-5 Al, and Ga-15 Al.

8. The synthetic resin composition of claim 1, wherein the gallium alloy is selected from the group consisting of Ga-35 Zn, Ga-70 Zn, Ga-40 In, Ga-50 Al and Ga-70 Al.

9. The synthetic resin composition of claim 7, wherein the particle size of the gallium or gallium alloy is 3 to 10 microns.

10. The synthetic resin composition of claim 1, further comprising a paraffin wax applied thereto.

11. A surfacing element for a glider for use on snow or ice which comprises a shaped resin comprising metallic gallium or gallium alloy particles, said alloy being selected from the group consisting of gallium-zinc, gallium-indium and gallium-aluminum, said particles being no larger than 150 microns, said particles being mixed uniformly with a synthetic resin.

12. A plastic gear which comprises a shaped resin comprising metallic gallium or gallium alloy particles, said alloy being selected from the group consisting of gallium-zinc, gallium-indium and gallium-aluminum, said particles being no larger than 150 microns, said particles being dispersed uniformly in a synthetic resin.

13. A constructional element which comprises a shaped resin comprising metallic gallium or gallium alloy particles, said alloy being selected from the group consisting of gallium-zinc, gallium-indium and gallium-aluminum, said particles being no larger than 150 microns, said particles being dispersed uniformly in a synthetic resin.

14. A marine structural element which comprises a shaped resin comprising metallic gallium or gallium alloy particles, said alloy being selected from the group consisting of gallium-zinc, gallium-indium and gallium-aluminum, said particles being no larger than 150 microns, said particles being dispersed uniformly in a synthetic resin.

15. A synthetic resin composition comprising plastic particles on which a metallic gallium or gallium alloy is deposited, said particles being dispersed uniformly in a synthetic resin, said particles being no larger than 150 microns, said alloy being selected from the group consisting of gallium-zinc, gallium indium and gallium-aluminum.

16. The synthetic resin composition of claim 15 wherein said particles are no larger than 50 microns.

17. The synthetic resin composition of claim 1, wherein the synthetic resin is selected from the group consisting of polystyrene, polyvinyl chloride, polyvinyl acetate, polyacrylonitrile, poly(meth)acrylic acid and salts and esters thereof, polyacrylamide, polyolefins, polytetrafluoroethylene, polycarbonates, polyphenylene sulfides, polybutadiene, polyisoprene, polychloroprene, styrene/butadiene rubber, acrylonitrile/butadiene/styrene rubber, polyurethane resins, nylon resins, polyester resins, phenolic resins, melamine resins, urea resins and epoxy resins.

18. The synthetic resin composition of claim 15, wherein the synthetic resin is selected from the group consisting of polyolefin and nylon.

19. The synthetic resin composition of claim 15, wherein synthetic resin is selected from the group consisting of polyethylene, polypropylene and nylon.

20. The synthetic resin composition of claim 15, wherein the gallium or gallium alloy particles are in an amount of 0.001 to 3 parts by weight per 100 parts by weight of the synthetic resin.

21. The synthetic resin composition of claim 15, wherein the gallium alloy is selected from the group consisting of Ga-5 Zn, Ga-15 Zn, Ga-40 In, Ga-5 Al, and Ga-15 Al.

22. The synthetic resin composition of claim 15, wherein the gallium alloy is selected from the group consisting of Ga-35 Zn, Ga-70 Zn, Ga-40 In, Ga-50 Al and Ga-70 Al.

23. The synthetic resin composition of claim 21, wherein the particle size of the gallium or gallium alloy is 3 to 10 microns.

24. The synthetic resin composition of claim 15, wherein the plastic particles have a particle size of 1 $\mu$m to 5 mm.

25. The synthetic resin composition of claim 24, wherein the plastic particles comprise polyethylene particles.

26. The synthetic resin composition of claim 15, further comprising a paraffin wax applied thereto.

27. A surfacing element for a glider for use on snow or ice which comprises a shaped resin having contained therein plastic particles on which a metallic gallium or gallium alloy is deposited, said particles being no larger than 150 microns, said alloy being selected from the group consisting of gallium-zinc, gallium-indium and gallium-aluminum, said particles being mixed uniformly with a synthetic resin.

28. A plastic gear which comprises a shaped resin having contained therein plastic particles on which a metallic gallium or gallium alloy is deposited, said particles being no larger than 150 microns, said alloy being selected from the group consisting of gallium-zinc, gallium-indium and gallium-aluminum, said particles being dispersed uniformly in a synthetic resin.

29. A constructional element which comprises a shaped resin having contained therein plastic particles on which a metallic gallium or gallium alloy is deposited, said particles being no larger than 150 microns, said alloy being selected from the group consisting of gallium-zinc, gallium-indium and gallium-aluminum, said particles being dispersed uniformly in a synthetic resin.

30. A marine structural element which comprises a shaped resin having contained therein plastic particles on which a metallic gallium or gallium alloy is deposited, said particles being no larger than 150 microns, said alloy being selected from the group consisting of gallium-zinc, gallium-indium and gallium-aluminum, said particles being dispersed uniformly in a synthetic resin.

* * * * *